(12) United States Patent
Dunko et al.

(10) Patent No.: US 7,945,866 B2
(45) Date of Patent: May 17, 2011

(54) METHODS, SYSTEMS AND COMPUTER PROGRAM PRODUCTS FOR DISPLAYING VIDEO CONTENT WITH AGING

(75) Inventors: Gregory A. Dunko, Cary, NC (US); Yojak H. Vasa, Cary, NC (US); Ram Asokan, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1423 days.

(21) Appl. No.: 11/137,731

(22) Filed: May 25, 2005

(65) Prior Publication Data

US 2006/0268183 A1 Nov. 30, 2006

(51) Int. Cl.
*G06F 3/048* (2006.01)
(52) U.S. Cl. ........... 715/867; 455/73; 455/566; 715/864
(58) Field of Classification Search .................. 709/205, 709/206, 219, 230; 715/864, 867; 455/414–420, 455/566, 574; 368/41, 107; 345/227.1, 589, 345/602; 386/200, 230
See application file for complete search history.

(56) References Cited

U.S. PATENT DOCUMENTS

| | | | | |
|---|---|---|---|---|
| 6,069,848 A | * | 5/2000 | McDonald et al. | 368/107 |
| 6,339,429 B1 | * | 1/2002 | Schug | 345/589 |
| 6,657,643 B1 | | 12/2003 | Horvitz et al. | |
| 6,769,120 B1 | | 7/2004 | Rodriguez | |
| 6,957,398 B1 | * | 10/2005 | Nayeri | 715/867 |
| 7,113,809 B2 | * | 9/2006 | Noesgaard et al. | 455/566 |
| 7,113,981 B2 | * | 9/2006 | Slate | 709/217 |
| 2002/0021288 A1 | * | 2/2002 | Schug | 345/169 |
| 2002/0054086 A1 | | 5/2002 | Van Oostenbrugge et al. | |
| 2003/0169306 A1 | * | 9/2003 | Makipaa et al. | 345/864 |
| 2005/0060669 A1 | * | 3/2005 | Lowles | 715/867 |

FOREIGN PATENT DOCUMENTS

| | | |
|---|---|---|
| JP | H 07-160853 | 6/1995 |
| JP | 2000-207083 | 7/2000 |
| JP | 2002-094881 | 3/2002 |
| JP | 2004-357225 | 12/2004 |
| WO | WO 2005/003954 A2 | 1/2005 |

OTHER PUBLICATIONS

Collins, Ericsson, Inc. "Operation modified by location and time of day" *Research Disclosure* 1925 (2000).
"Dynamic Time-Dependent User Interface Modification" *IBM Technical Disclosure Bulletin* 37(1) 287-289 (1994).
International Search Report and Written Opinion for PCT/US2006/041728: Date of mailing Aug. 18, 2006.
First Office Action dated Jun. 18, 2010, JP Patent Application No. 2008-512261, 3 pages.

* cited by examiner

*Primary Examiner* — Thai Tran
*Assistant Examiner* — Mishawn Dunn
(74) *Attorney, Agent, or Firm* — Myers Bigel Sibley & Sajovec

(57) ABSTRACT

Methods of displaying video content include obtaining a video content record to be displayed and determining an associated aging characteristic associated with the video content record. A current age is determined for the obtained video content record and a modified video content record is generated for display based on the determined aging characteristic and the determined current age of the obtained video content record. The obtained video content record may be an animation, which may include audio data. The obtained video content record may also be a still image.

31 Claims, 7 Drawing Sheets

METHODS, SYSTEMS AND COMPUTER PROGRAM PRODUCTS FOR DISPLAYING VIDEO CONTENT WITH AGING

BACKGROUND OF THE INVENTION

The present invention relates to video content display systems, methods and computer program products and, more particularly, to systems, methods and computer program products for modifying display of such video content.

A variety of consumer devices, including mobile devices, such as mobile terminals, include both a processor and user output devices, such as displays, speakers and the like. For such devices, the processor is generally configured to render many forms of multimedia content, such as audio files, pictures, animations and the like. In addition to "playback" type rendering of such multimedia content, available multimedia content at the mobile terminal may be used for a variety of purposes, such as a display background, themes, ring tones and/or other device operations/events.

A still image may be used, for example, as a background, such as a scenic image presented on the display screen as a background for other information. However, background displays, such as screen savers, are typically animations, such as a bouncing ball or the like, which provide changing images that may reduce the risk of damage to the display, such as burn-in. These animations are generally a video content record including a loop of different image displays that are sequenced based on a strict time sequence and which typically operate independent of mobile terminal state and/or timers. For example, an animated bouncing ball may complete a full sequence of "strike bottom" then "bounce to top" then start "falling" and "strike bottom" again. The animation may stop after one sequence or may continue in a loop. However, the animation repeat is exactly the same regardless of when or how often it is repeated. While such animations are typically utilized as screen savers or backgrounds, they might also be used as icons or the like on a display of a processor device.

SUMMARY OF THE INVENTION

In some embodiments of the present invention, methods of displaying video content include obtaining a video content record to be displayed and determining an associated aging characteristic associated with the video content record. A current age is determined for the obtained video content record and a modified video content record is generated for display based on the determined aging characteristic and the determined current age of the obtained video content record. The obtained video content record may be an animation, which may include audio data. The obtained video content record may also be a still image.

In other embodiments of the present invention, the method further includes displaying the modified video content record on a display of a processor device. Determining a current age, generating a modified video content record and displaying the modified video content record may be repeated to continue aging the obtained video content record. Determining a current age and generating a modified video content record may be preceded by displaying the obtained video content record. A frequency of repeating determining a current age and generating and displaying a modified video content record may be based on a predetermined elapsed time interval after displaying the obtained video content record.

In further embodiments of the present invention, determining a current age includes measuring a metric of the processor device and generating a modified video content record includes generating the modified video content record based on the measured metric and the aging characteristic of the video content record. A frequency of repeating determining a current age and generating and displaying a modified video content record may be based on a value of the measured metric. The metric may be one or more of an event count, battery life of the processor device, a time elapsed and/or occurrence of a specified event on the processor device.

In other embodiments of the present invention, an initial state of the obtained video content record is saved. A request is received to restore a obtained video content record and a current modified video content record is replaced with the saved initial state responsive to a received request to restore an obtained video content record.

In yet further embodiments of the present invention, the processor device is a mobile device and the obtained video content record is an icon and/or background for the display of the mobile device. The processor device may be a mobile terminal and obtaining a video content record may include downloading the video content record over a wireless communication link to the mobile terminal from a content server. The downloaded video content record may be an initial age state of a representation of a living object and generating a modified video content record may include increasing the age state of the representation of a living object based on the current age for the downloaded video content record.

In other embodiments of the present invention, the processor device is a mobile terminal and determining a current age includes obtaining a count of power cycles since a first display of the obtained video content, obtaining a count of calls at the mobile terminal since a first display of the obtained video content, determining a charge level for a battery of the mobile terminal and/or determining an elapsed time since a first display of the obtained video content. Generating a modified video content record may include modifying at least one of a brightness and/or sound of the modified video content record.

In further embodiments of the present invention, determining a current age and generating a modified video content are performed by an aging algorithm executing on the processor device and the associated aging characteristic is obtained by the aging algorithm from the video content record. Generating a modified video content record may include obtaining the associated aging characteristic from a database communicatively coupled to the aging algorithm. The associated aging characteristic may be a value maintained by the aging algorithm that is independent of content of the obtained video content record. The aging characteristic may be a plurality of values, each associated with a file type of a video content record to be displayed.

In yet further embodiments of the present invention, the modified video content record for display is a sequence of still images associated with different ages of the obtained video content record updated to include a still image associated with the current age for the obtained video content record and displaying the modified video content record includes displaying the sequence of still images. The video content record in other embodiments is a contact list of the processor device and generating a modified video content record includes generating a re-ordered display sequence for the contact list based on a most recent usage of respective contacts within the contact list.

In other embodiments of the present invention, systems for displaying video content include a video content record to be displayed and an aging module. The aging module is configured to determine an associated aging characteristic associated with the video content record, determine a current age for the obtained video content record and generate a modified video content record for display based on the determined aging characteristic and the determined current age of the obtained video content record.

In yet further embodiments of the present invention, methods of playing audio content include obtaining an audio content record to be played and determining an associated aging characteristic associated with the audio content record. A current age is determined for the obtained audio content record and a modified audio content record is generated for play based on the determined aging characteristic and the determined current age of the obtained audio content record.

While described above primarily with reference to method aspects, it will be understood that the present invention also includes apparatus and computer program products for delivering electronic content.

DETAILED DESCRIPTION OF EXEMPLARY EMBODIMENTS

Figure 1:
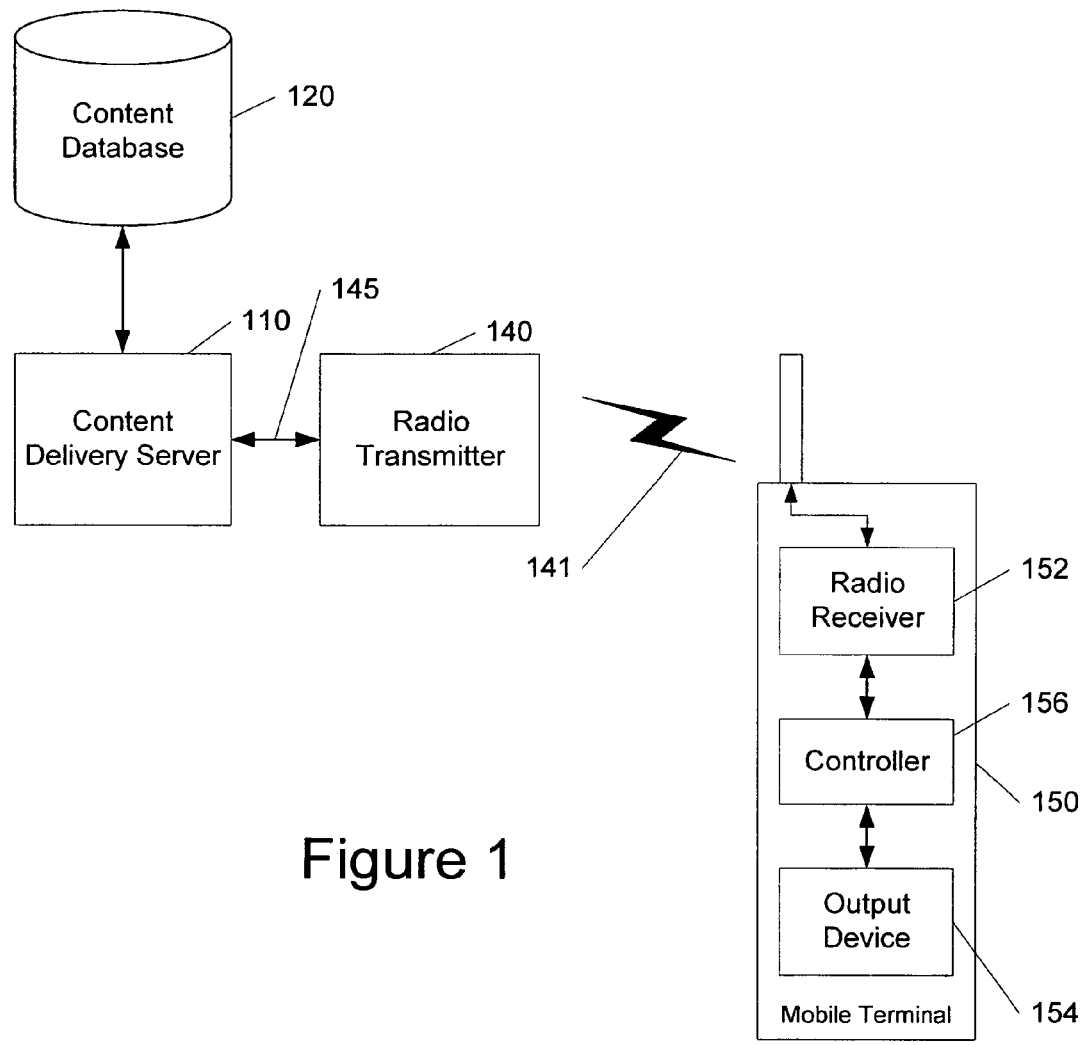
FIG. 1 is a block diagram illustrating system for displaying video content with aging on a mobile terminal receiving video content from a content delivery server according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "mobile terminal" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "mobile terminals" may be portable, transportable, installed in a vehicle (aeronautical, maritime, or land-based), or situated and/or configured to operate locally and/or in a distributed fashion at any other location(s) on earth and/or in space. As used herein, a "mobile device" includes mobile terminals as well as mobile devices that do not support wireless communications. As used herein, a "a processor device" includes mobile devices as well as non-mobile devices.

FIG. 1 is a block diagram illustrating a system for displaying video content with aging on a mobile terminal receiving video content from a content delivery server according to some embodiments of the present invention. For the embodiments illustrated in FIG. 1, video content that will be displayed with aging is obtained by a mobile terminal 150 from a content database 120 through a content delivery server 110. More particularly, the mobile terminal 150 downloads the content from the content delivery server 110 over a wireless link 141 between a radio transmitter 140 and the mobile terminal 150. The radio transmitter 140 is shown as coupled to the content delivery server 110 through a wireless or wired connection 145. Similarly, in some embodiments of the present invention, the link 141 may be a wired connection.

The radio transmitter 140 may be, for example, a base station of a wide area cellular communications network, a wireless local area network (WLAN) transmitter, such as a transmitter operating according to an Institute for Electrical and Electronic Engineers (IEEE) 802.11 standard protocol, or the like. Furthermore, while shown as a mobile terminal 150 in FIG. 1, it will be understood that, in other embodiments of the present invention, video and/or audio content may be displayed/played with aging on a desktop computer or other processor device having an associated display or other multimedia output device(s) coupled thereto. The desktop computer or other processor device may obtain the content for display/play from a database associated with the processor device or through a wired or wireless connection to another source of content, such as the content delivery server 110 illustrated in FIG. 1.

The mobile terminal 150 shown in the embodiments of FIG. 1 includes a radio receiver 152 configured to receive and download content, such as a video content record, over the wireless communication link 141 from the content delivery server 110. The mobile terminal 150 further includes a controller 156 or other processor configured to determine aging characteristics for video and/or audio content records to be displayed and a current age for such video and/or audio content records, and to generate modified video and/or audio content records for display/play based on the aging characteristics and current age of the video and/or audio content record. For video content records, the output device 154 of the mobile terminal 150 may be, for example, a display. In other embodiments of the present invention, for example, where aging is to be applied to audio content to be played or audio and video content, the output device 154 may be speakers or the like.

As generally noted above, various embodiments of the present invention provide for creation and execution of animated content, still images, and/or audio content that ages based on a time reference of the mobile terminal 150 or other processor device presenting the video and/or audio content. Various embodiments of the present invention determine the mobile terminal 150 "time" based on various reference measures. For example, the device time reference may be an absolute time of initiation, such as a time count from the first time an animation or other video content record is started and continuing from that reference time. The absolute time reference may be limited to counting while the mobile terminal 150 is activated or may continue through power down/power up sequences of the mobile terminal 150. In other embodiments of the present invention to be described herein, the "time" reference may be use or event driven. For example, the video and/or audio content record may be aged based on mobile terminal communication events, such as every time a call is made and/or received by the mobile terminal 150.

Various examples of aging of content will now be provided to provide context for the explanation of various embodiments of the present invention that will follow. In one example, a still image, such as a picture of a fancy red European sports car, is used as a background in a standby mode of the mobile terminal 150. Initially, the car image shows a sparkling new car. Over time, the car ages such that there are, for example, scratches in the paint and/or dents or the like shown in the image of the sports car. Eventually, the car may age to the point where there are dents and spots of putty/primer, rust, flat tires or the like and the car may even eventually be placed on blocks. This aging of the image may occur over days, weeks or over the periods of the "time" reference of the mobile terminal 150 used in determining a current age of the image of the sports car.

Another example is the use of an animated icon on a mobile terminal 150 as a message waiting indicator. Initially the icon is a clean and "high energy" version of the icon image. If the message waiting indicator is ignored over time, eventually, the icon is displayed as a lower energy and/or spider webs or dust and the like appear over the displayed icon.

By way of further example, where the video and/or audio content to be displayed and/or played is downloaded to the mobile terminal 150 from a source, such as the content delivery server 110, an operator of the content delivery server 110 may make available downloadable "seeds" or pods of video and/or audio content. These "pods" may initially be an image of an egg or a small creature or an associated sound or the like.

Over time, after downloading, these pods may grow or may become increasingly beautiful or make more complex sounds or the like. The growth of the pods may be based on an absolute time reference of the mobile terminal 150 or other "time" aging reference, such as usage patterns of the mobile terminal 150 or the like.

Where the seeds or pods (or other content) are downloaded from a content delivery server 110, the content delivery server 110 may be configured to associated information on aging characteristics for the downloaded pods (or other content) with the content file downloaded to the mobile terminal 150, which aging characteristic information downloaded from the content delivery server 110 may be used in determining the current age and/or the appropriate modifications to an image, sound or the like for display/play as an aged version thereof. The content delivery server 110 may also be configured to provide download of less "intelligent" content records and the mobile terminal 150 may be able to identify the level of "smartness" or aging information provided with downloaded content and process less intelligent content based on aging characteristic criteria maintained by the mobile terminal 150 as well as more intelligent processing, where additional aging characteristic information is downloaded from the server 110 for a record to be displayed and/or played at the mobile terminal 150.

While generally described above with reference to aging of video content, such as still images or animations, it will be understood that aging in accordance with some embodiments of the present invention is described with respect to playing of audio content and/or with respect to a combination of audio and video content.

Figure 2:
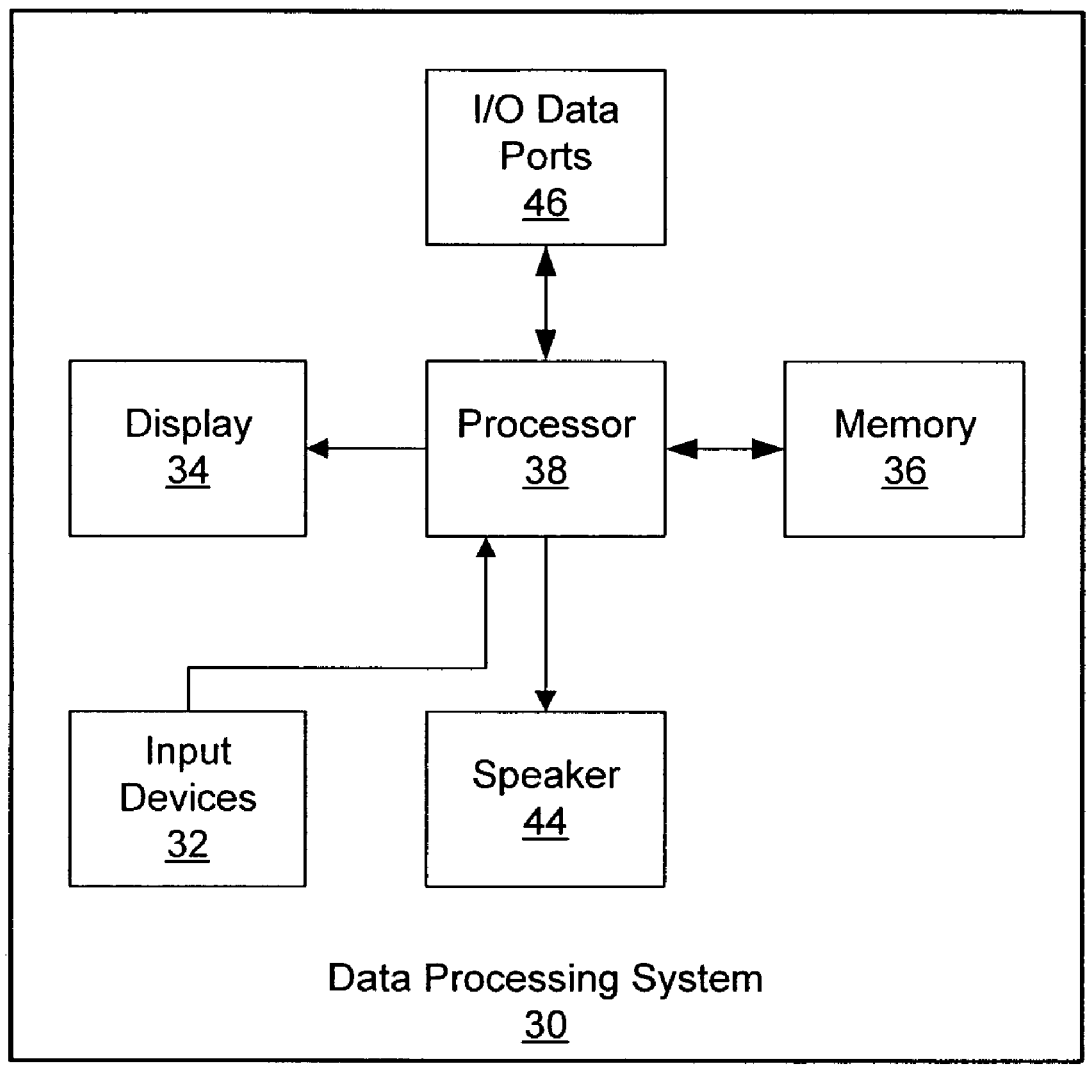
FIG. 2 is a block diagram of a data processing system suitable for use as video display system according to some embodiments of the present invention.

Referring now to FIG. 2, a block diagram of data processing systems suitable for use in display and/or playback of content with aging according to some embodiments of the present invention will be discussed. As illustrated in FIG. 2, an exemplary embodiment of a data processing system (processor or device) 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. For example, the I/O data ports 46 may support wireless communications based on a variety of wide area or local network wireless protocols, such as those utilized for the communication link 141 shown in FIG. 1 These components may be conventional components, such as those used in many conventional data processing systems, which may be configured to operate as described herein.

Figure 3:
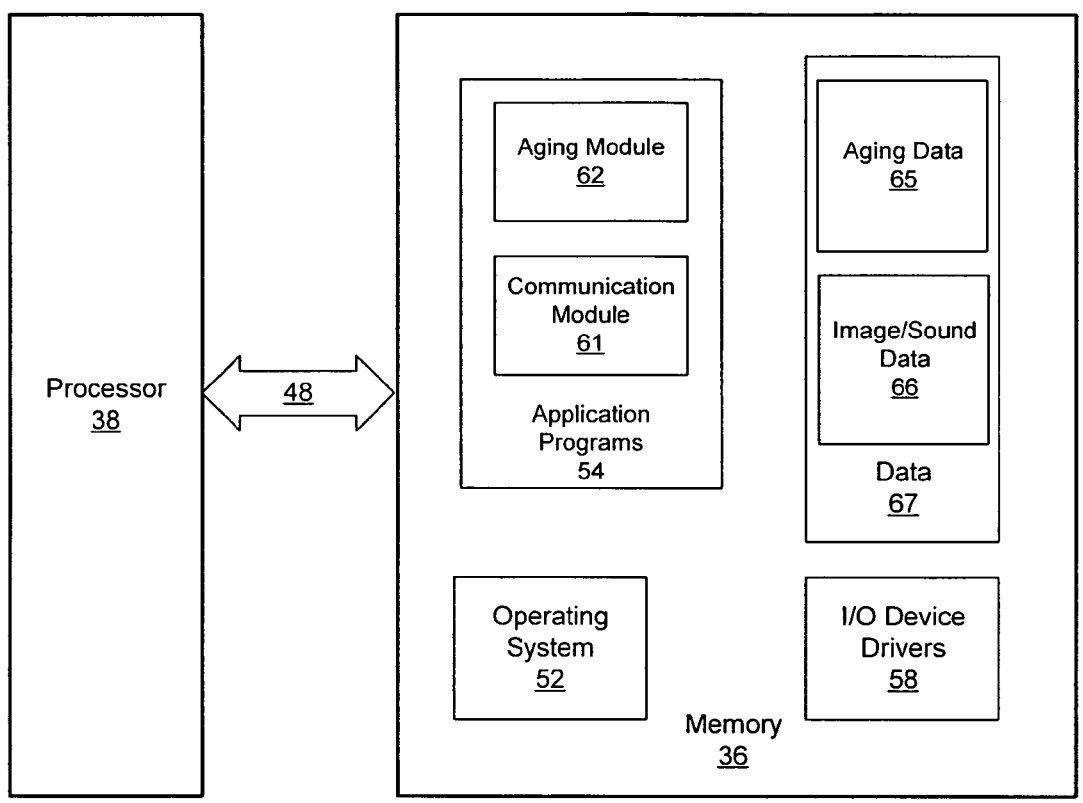
FIG. 3 is a block diagram of a data processing system implementing a video display system according to some embodiments of the present invention.

FIG. 3 is a block diagram of data processing systems that illustrate systems, methods, and/or computer program products in accordance with some embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system (processor device) 30. The memory 36 can include, but is not limited to, the following types of devices: cache, ROM, PROM, EPROM, EEPROM, flash memory, SRAM and/or DRAM.

As shown in FIG. 3, the memory 36 may include several categories of software and data used in the data processing system 30: the operating system 52; the application programs 54; the input/output (I/O) device drivers 58; and the data 67.

As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 67 represents the static and dynamic data used by the application programs 54, the operating system 52, the I/O device drivers 58, and other software programs that may reside in the memory 36.

As is further seen in FIG. 3, the application programs 54 may include an aging module 62 and/or a communication module 61. The data portion 67 of the memory 36, as shown in the embodiments illustrated in FIG. 3, may include aging data 65 and/or image/sound data 66. The communication module 61 may be configured to exchange communications with a wireless transmitter 140 to establish a communication link to download video and/or audio content for display/play with aging. The aging module 62 may be configured to determine an aging characteristic associated with a content record to be aged, determine a current age of the content and to generate a modified content record based on the aging characteristic and the current age.

The aging data 65 may include a variety of aging characteristics, such as rules or the like, associated with one or a group of content records, for example, for all files of a given type and/or for a particular file name associated with a specific content record, as will be discussed further with reference to various embodiments herein. The image/sound data 66 may include both a current content record for display/play and/or saved initial states of content record(s) allowing such record(s) to be restored to an earlier (less aged/un-aged) state responsive to a user request. The earlier state, in various embodiments, may be an initial state or one or more intermediate state. The intermediate states may be retained as an image/audio file ready for display/play or may be generated at the time of receipt of a request for the intermediate state from a user based on the selected intermediate state age and the aging algorithm/aging characteristic associated with the image/audio file.

While embodiments of the present invention have been illustrated in FIG. 3 with reference to particular divisions between application programs, data and the like, the present invention should not be construed as limited to the configurations of FIG. 3 but is intended to encompass any configuration capable of carrying out the operations described herein. Furthermore the functionality described herein may be provided, for example, by plug-ins or other ancillary code to provide functionality to existing applications.

It will be understood that the aging module 62 and aging data 65 may be provided in the mobile terminal 150, so that updated video/audio are generated at the mobile terminal 150. In other embodiments, the aging module 62 and/or aging data 65 may be located in a remote location, such as at the content delivery server 110, and updated video/audio may be generated at the remote location and then provided to the mobile terminal 150. In such embodiments, the mobile terminal 150 may provide a current age and/or event aging data to the remote location for use in generating updated video/audio and/or aging may be based on a passage of time or the like that may be maintained at the remote location without the use of current age information from the mobile terminal 150.

Operations for displaying video content according to various embodiments of the present invention will now be described with reference to the flowchart illustration of FIGS. 4-7. While the description will generally refer to video content, it will be understood that the present invention in some embodiments is directed to aging of audio content, which may be aged in a substantially similar manner. Accordingly, various details of particular embodiments for aging of video content as described herein for video also may be understood as applicable to audio content with or without associated video content. Referring first to the embodiments illustrated in FIG. 4, operations begin at Block 400 with obtaining a video content record to be displayed. The obtained video content record may be, for example, an animation and the animation may include audio data as well as image display data. In other embodiments of the present invention, the obtained video content record may be a still image. An associated aging characteristic associated with the video content record is determined (Block 405). For example, operations at Block 405 may include measuring a metric of the processor device displaying the content. The metric of the device may be, for example, an event count, a battery life of the processor device, a time elapsed, and/or occurrence of specified event on the processor device.

A current age is determined for the obtained video content record (Block 410). In various embodiments of the present invention where the processor device is, for example, a mobile terminal, determining a current age at Block 410 may include obtaining a count of power cycles since a first display of the obtained video content, obtaining a count of calls at the mobile terminal since a first display of the obtained video content, determining a charge level for a battery of the mobile terminal and/or determining an elapsed time since a first display of the obtained video content. In particular embodiments of the present invention, determining a current age is performed by an aging algorithm executing on the processor device, which aging algorithm may also obtain the associated aging characteristic at Block 405. The aging algorithm may, in some embodiments, obtain the aging characteristics from the video content record itself (i.e., each video content record may carry its own associated aging information specific to that video content record). However, in other embodiments of the present invention, the aging algorithm may obtain the associated aging characteristic from a database communicatively coupled to the aging algorithm. In particular embodiments, the associated aging characteristic may be a value maintained by the aging algorithm that is independent of content of the obtained video content record. The aging characteristic in the database may be a plurality of values, each associated with a file type of a video content record to be displayed. In other embodiments, the associated aging characteristic may be maintained for each individual file or group of files in the database.

A modified video content record is generated for display based on the determined aging characteristic and the determined current age of the obtained video content record (Block 415). For example, where determining a current age is based on measuring a metric of the processor device, generating the modified video content record may be based on the measured metric and the aging characteristic of the video content record. In particular embodiments of the present invention, where the obtained video content record is initial aged state of a representation of a living object, generating a modified video content record at Block 415 may include increasing the age state of the representation of the living object based on the current age for the obtained video content record. In some embodiments, generating a modified video content record may include modifying at least one of a brightness and/or sound of the modified video content record.

It will further be understood that, while various of the examples herein refer to chronological type aging from a younger/fresher state to an older/deteriorated state, aging as used herein more generally refers to a changing character over the reference "time" for the image/audio and may be, for example, in the opposite state change direction. For example, an image of an older person could grow younger over "time." Similarly, an end state could be reached and subsequent aging may result in little or no further changing to the image/audio. For example, an image of a person could age up to an age sixty and then stop aging, where such details of the aging may be defined by the associated aging characteristic.

Figure 4:
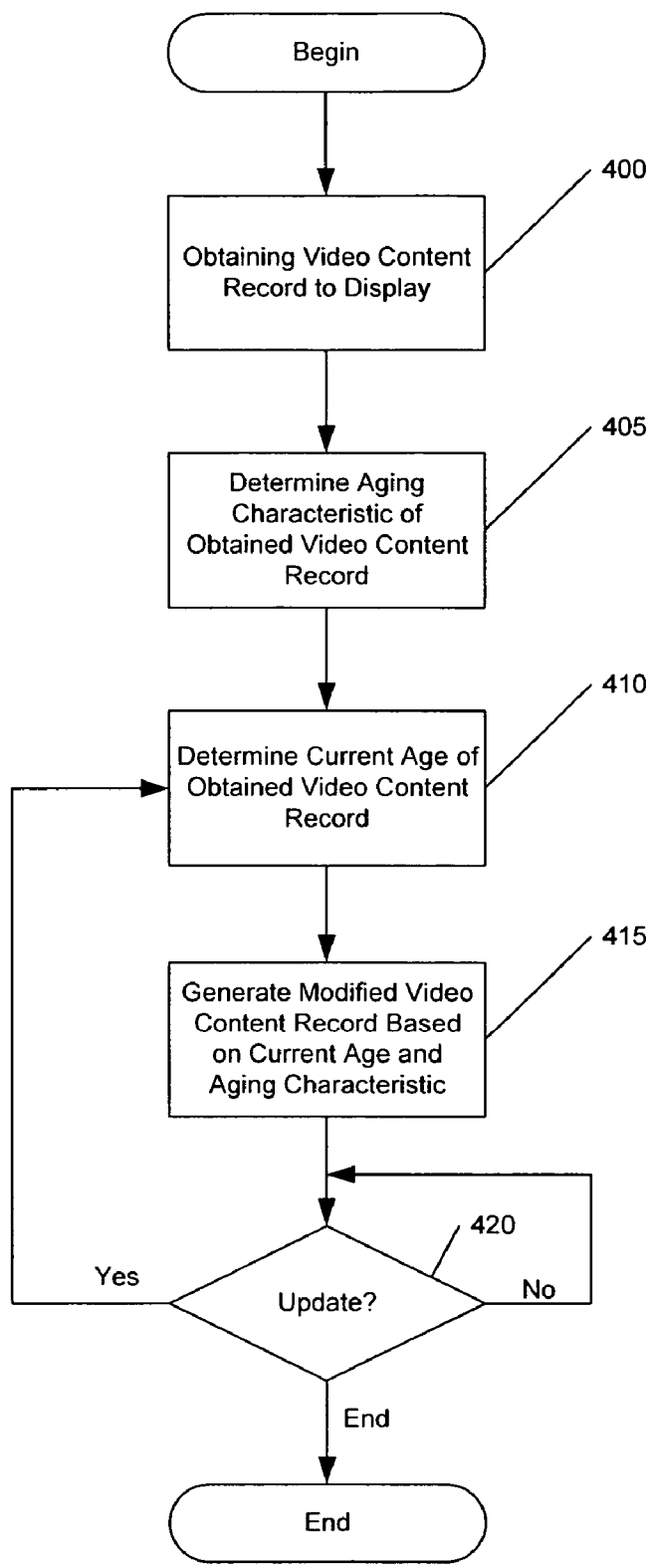
FIG. 4 is a flowchart illustrating operations for display of video content according to some embodiments of the present invention.

As illustrated at Block 420 of the embodiments of FIG. 4, operations for displaying a video content record with aging may include repeating determining a current age (Block 410) and generating a modified video content record (Block 415) to continue aging the obtained video content record. The frequency of updating at Block 420, in some embodiments of the present invention, is based on a predetermined elapsed time interval after displaying the obtained video content record. In other embodiments of the present invention, the frequency of repeating aging operations at Block 420 is determined based on a value of a measured metric of the processor device used in determining a current age of the processor device. For example, when the processor device is a mobile terminal, the aging algorithm may be repeated every time an incoming call is received at the mobile terminal. Note that the measured metric used for determining a frequency of updating the aging characteristic of the modified video content record need not be based on the same metric as the metric used to determine a current age of the video content record. For example, the aging characteristic of the content may be based on a number of outgoing calls while the update sequence of the display may be based on incoming calls in various embodiments of the present invention.

In some embodiments of the present invention, the modified video content record for display may include both an aged appearance of an image/sound of an audio as well as a modified sequence of display/play. For example, for an image, the display of the modified image may include a slide show and/or video sequence of the image from its initial state through the current aged state or some sub-combination of such images. The display time may vary and become longer as the image ages, the duration of display for each image in the sequence may be shortened as additional images are added to the combination, the most recent "x" images in the sequence may be displayed or the like.

In further embodiments of the present invention, the video content may be associated with data, such as a phone number in a contact list, that is entered into a mobile terminal or the like. Such information corresponds to video content as it is typically presentable to a user on a display of the mobile terminal. Aging of a data record video content may generate a modified video/audio record as a notification to a user that the phone number should be deleted, the phone number should be called, for example, so as not to neglect a friend or the like associated with the number, and the like. Alternatively, an automated action, such as initiating a call, deleting a number, reordering of a display order of a phone number list or the like may be taken.

Figure 5:
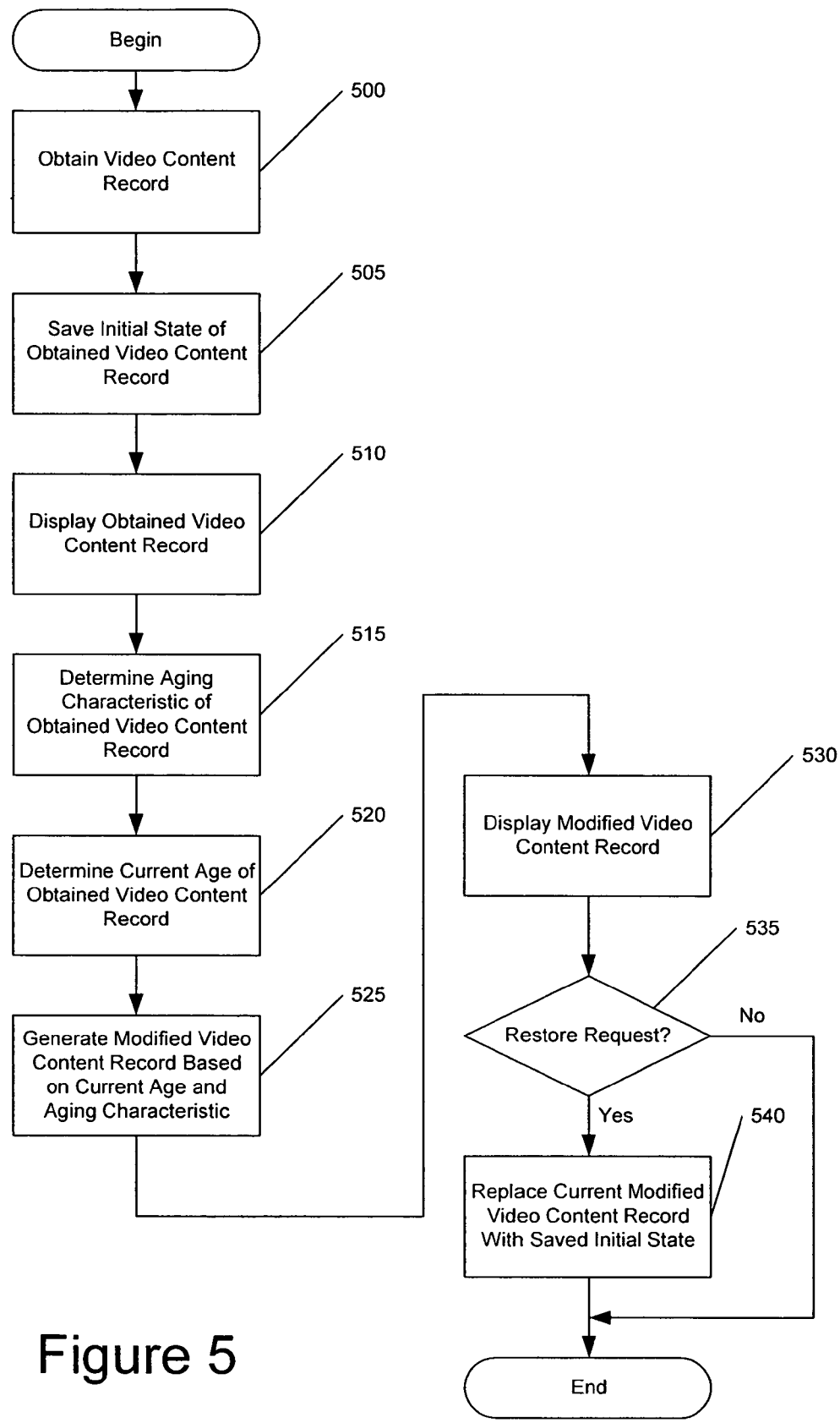
FIG. 5 is a flowchart illustrating operations for display of video content according to further embodiments of the present invention.

Further embodiments of the present invention for displaying video content with aging will now be described with reference to the flowchart illustration of FIG. 5. As shown in the embodiments of FIG. 5, operations begin at Block 500 by obtaining a video content record for display. For example, the obtained video content record may be downloaded to a mobile terminal that is a processor device displaying the video content. The download to the mobile terminal device may be over a wireless communication link to the mobile terminal from a content server, such as the content delivery server 110 illustrated in FIG. 1. The obtained video content record may be, for example, an icon and/or background for the display of the mobile terminal. However, it will be understood that the processor device need not be a mobile device in other embodiments of the present invention and may be a mobile device that is not a wireless mobile terminal in other embodiments. The obtained video content record may be obtained by means other than a wireless communication link to the mobile device.

An initial state of the obtained video content record is saved (Block 505). The obtained video content record is displayed by the processor device (Block 510). An aging characteristic of the obtained video content record is determined, for example, by one of the methods described previously with reference to FIG. 4 (Block 515). A current age of the obtained video content record is determined, for example, by one of the methods described previously with reference to FIG. 4 (Block 520). In addition, a modified video content record is generated for display based on determined aging characteristic and the determined current age of the obtained video content record, for example, by one of the methods described previously with reference to the embodiments of FIG. 4 (Block 525).

The modified video content record is displayed on a display of a processor device providing for the aged video content display (Block 530). It will be understood that, while not expressly shown in FIG. 5, the repeating of aging operations described previously with reference to FIG. 4 may also be used for the embodiments illustrated in FIG. 5.

As shown for the embodiments of FIG. 5, a request to restore an obtained video content record may be received, for example, from a user of the processor device providing display of the video content record with aging (Block 535). If a request to restore an obtained video content record is received (Block 535), a current modified video content record is replaced with the saved initial state, saved at Block 505 as described above, responsive to the received request to store the obtained video content record (Block 540). If a restore request is not received (Block 535), aging operations may continue without restoration to the initial state.

Figure 6:
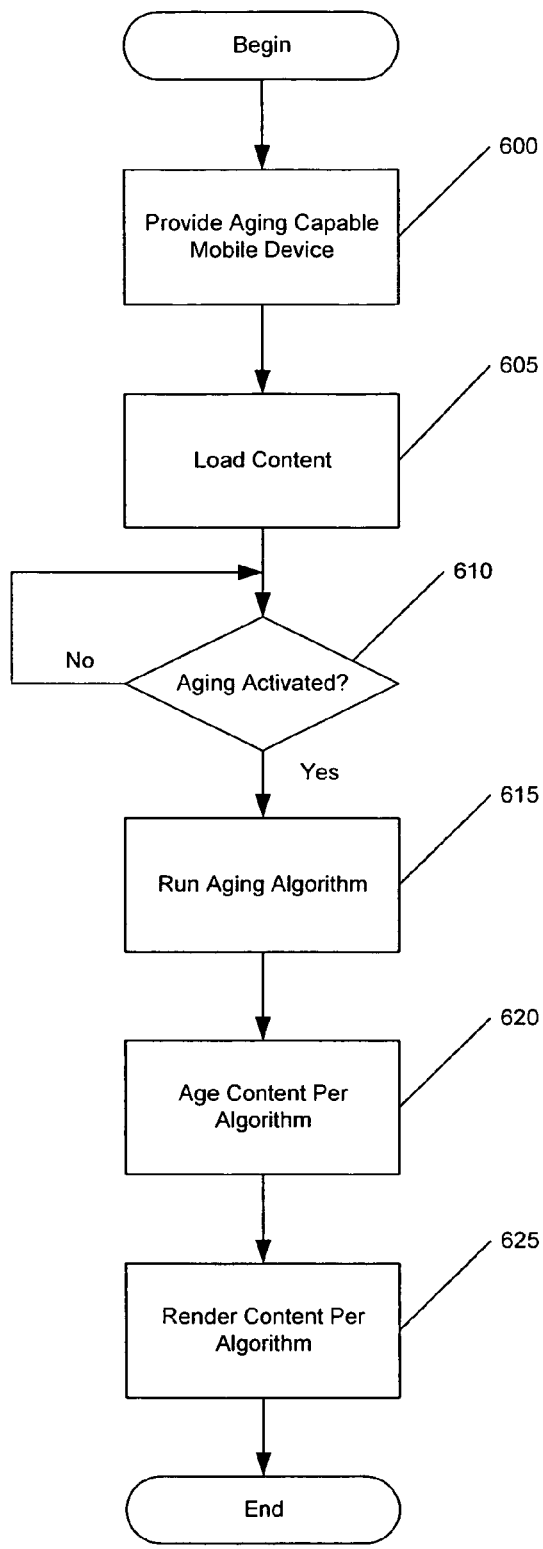
FIG. 6 is a flowchart illustrating operations for display of video content according to further embodiments of the present invention.

Further embodiments of the present invention will now be described with reference to the flow chart illustration of FIG. 6. As shown in the embodiments of FIG. 6, operations begin at Block 600 with providing an aging capable mobile device. Various capabilities may be provided to the mobile device to execute aging of content. Examples of such capabilities may include the ability to support animation/sound images or the like, a processor capability to run an aging algorithm as will be described with reference to subsequent aspects of FIG. 6, and/or the ability to use the aging process to modify the content and render the modified content for display/play.

Content for display/play is loaded to the mobile device (Block 605). The content to be loaded may, in some embodiments of the present invention, be acquired via a user requested download via beaming or other form of communication from a device of a friend of the user or the like, may be contained within a message received at the mobile device, such as an email or a multimedia message service (MMS), may be pushed to the user device or the like. The content may then be activated by the user for aging (Block 610). This aging activation may, for example, occur responsive to a first use, occur after some time period and/or may be triggered by some event at the mobile device. Once aging is activated (Block 610), an aging algorithm is executed on the mobile device (Block 615). The activated aging algorithm may consider a number of different items/metrics associated with the mobile device, such as certain specific events, a frequency of events (specific or general), a time/timers, a level of mobile charge (i.e., how much battery life remains in the mobile terminal) and/or other metrics determinable by the mobile device.

Loaded content is aged per execution of the aging algorithm (Block 620). For example, a processor in the mobile device may use the parameters/metrics considered by the mobile device to determine a level and extent of "aging" for the content. The aging algorithm then renders modified content by applying the aging as appropriate to the content (Block 625). For example, aging may include image modifications, brightness, sound changes and the like, which modifications are used in rendering a modified content record for display/play. For example, downloadable "seeds" may evolve into pictures, ring tones, videos or the like or may evolve into themes over time.

Aging characteristics need not be directly time based and may be based on other parameters, such as an amount of memory used (for example, as memory of the mobile device fills up, more scratches are shown in an image), event driven (such as only changed when the display backlight turns off when the mobile device is power cycled, when the mobile device places a call and the like), may be rendered based on battery charge and/or the like. Note that, as described with reference to the embodiments of FIG. 5, a user override function may be provided to allow a user to restore loaded content to a "pristine" form.

Figure 7:
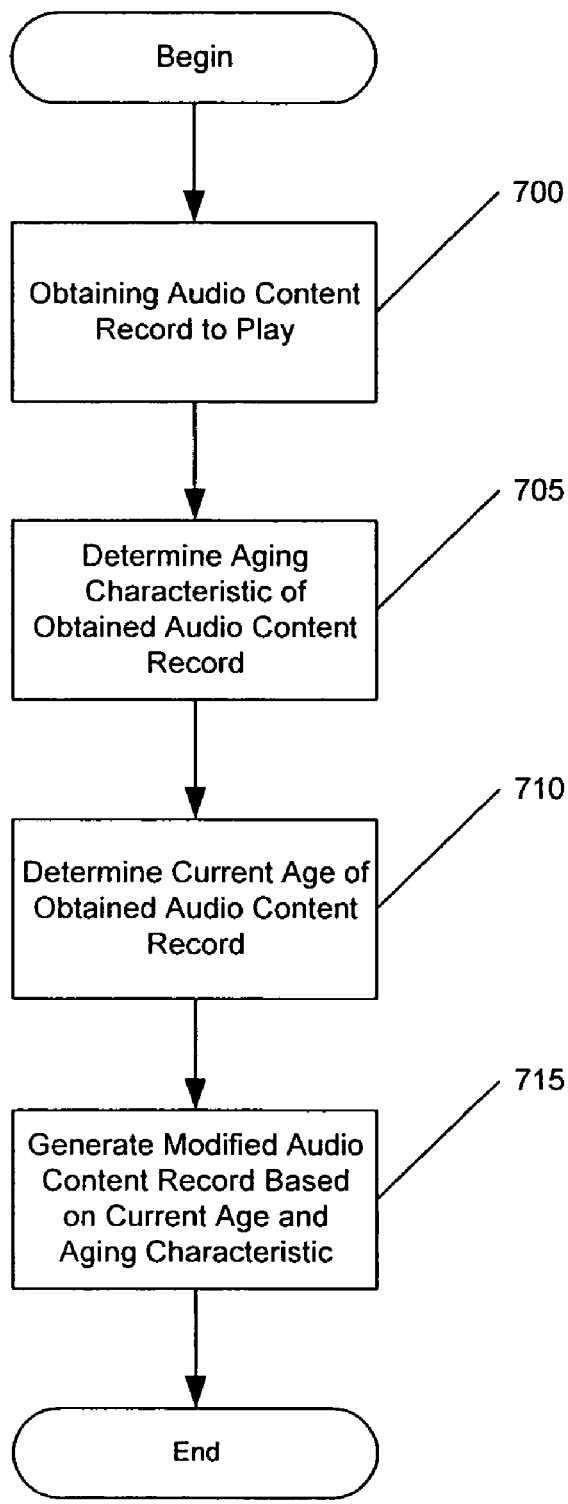
FIG. 7 is a flowchart illustrating operations for playing of audio content according to some embodiments of the present invention.

Further embodiments of the present invention providing for playing of audio content with aging will now be described with reference to the flow chart illustration of FIG. 7. For the embodiments illustrated in FIG. 7, operations begin at Block 700 by obtaining an audio content record to be played. An associated aging characteristic associated with the audio content record is determined (Block 705). A current age is determined for the obtained audio content record (Block 710). A modified audio content record is generated for play based on the determined aging characteristic and the determined current age of the obtained audio content record (Block 715). It will be understood that both the original obtained audio content record and the modified audio content record may be played for a user. Similarly, it will be understood that the aging operations in generating modified audio content record may be repeated based on criteria and at a frequency as described with reference to the video content record aging embodiments described previously. It will further be understood that various embodiments of the present invention may provide for aging of both video and audio content records.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of displaying video content, comprising:
   obtaining a video content record to be displayed;
   determining an associated aging characteristic associated with the video content record;
   determining a current age for the obtained video content record;
   generating a modified video content record for display based on the determined aging characteristic and the determined current age of the obtained video content record; and
   displaying the modified video content record on a display of a processor device, wherein the processor device comprises a mobile terminal and wherein determining a current age comprises obtaining a count of power cycles since a first display of the obtained video content record, obtaining a count of calls at the mobile terminal since a first display of the obtained video content record and/or determining a charge level for a battery of the mobile terminal.

2. The method of claim 1 wherein the obtained video content record comprises an animation.

3. The method of claim 2 wherein the animation includes audio data.

4. The method of claim 1 wherein the obtained video content record comprises a still image.

5. The method of claim 1 wherein the method further comprises repeating determining a current age, generating a modified video content record and displaying the modified video content to continue aging the obtained video content record.

6. The method of claim 5 wherein determining a current age and generating a modified video content record are preceded by displaying the obtained video content record and wherein a frequency of repeating determining a current age and generating and displaying a modified video content record is based on a predetermined elapsed time interval after displaying the obtained video content record.

7. The method of claim 5 wherein determining a current age comprises measuring a metric of the processor device and wherein generating a modified video content record comprises generating the modified video content record based on the measured metric and the aging characteristic of the video content record.

8. The method of claim 7 wherein a frequency of repeating determining a current age and generating and displaying a modified video content record is based on a value of the measured metric.

9. The method of claim 7 wherein the metric comprises at least one of an event count, battery life of the processor device, a time elapsed and/or occurrence of a specified event on the processor device.

10. The method of claim 5 further comprising:
    saving an initial state of the obtained video content record;
    receiving a request to restore a obtained video content record; and
    replacing a current modified video content record with the saved initial state responsive to a received request to restore an obtained video content record.

11. The method of claim 5 wherein the processor device comprises a mobile device and wherein the obtained video content record is an icon and/or background for the display of the mobile device.

12. The method of claim 5 wherein the processor device comprises a mobile terminal and wherein obtaining a video content record comprises downloading the video content record over a wireless communication link to the mobile terminal from a content server.

13. The method of claim 12 wherein the downloaded video content record comprises an initial age state of a representation of a living object and wherein generating a modified video content record comprises increasing the age state of the representation of a living object based on the current age for the downloaded video content record.

14. The method of claim 5 wherein generating a modified video content record includes modifying at least one of a brightness and/or sound of the modified video content record.

15. The method of claim 5 wherein determining a current age and generating a modified video content are performed by an aging algorithm executing on the processor device and wherein the associated aging characteristic is obtained by the aging algorithm from the video content record.

16. The method of claim 1, wherein obtaining the video content record comprises obtaining the video content record from a memory operatively coupled to a data processing system and wherein generating the modified video content record is followed by:
   storing the modified video content record in the memory; and
   displaying the modified video content record on a display of the data processing system.

17. The method of claim 16, wherein storing the modified video content record is followed by:
   obtaining the modified video content record from the memory;
   determining a new current age for the obtained modified video content record; and
   generating a new modified video content record for display based on the determined aging characteristic and the determined new current age of the obtained modified video content record.

18. The method of claim 1, wherein the current age for the obtained video content record is a variable that can be an initial age or at least one other age.

19. A method of displaying video content, comprising:
   obtaining a video content record to be displayed;
   determining an associated aging characteristic associated with the video content record;
   determining a current age for the obtained video content record;
   generating a modified video content record for display based on the determined aging characteristic and the determined current age of the obtained video content record; and
   displaying the modified video content record on a display of a processor device, wherein determining a current age and generating a modified video content are performed by an aging algorithm executing on the processor device and wherein generating a modified video content record includes obtaining the associated aging characteristic from a database communicatively coupled to the aging algorithm.

20. A method of displaying video content, comprising:
   obtaining a video content record to be displayed;
   determining an associated aging characteristic associated with the video content record;
   determining a current age for the obtained video content record;
   generating a modified video content record for display based on the determined aging characteristic and the determined current age of the obtained video content record; and
   displaying the modified video content record on a display of a processor device, wherein determining a current age and generating a modified video content are performed by an aging algorithm executing on the processor device and wherein the associated aging characteristic is a value maintained by the aging algorithm that is independent of content of the obtained video content record.

21. The method of claim 20 wherein the aging characteristic comprises a plurality of values, each associated with a file type of a video content record to be displayed.

22. A method of displaying video content, comprising:
   obtaining a video content record to be displayed;
   determining an associated aging characteristic associated with the video content record;
   determining a current age for the obtained video content record;
   generating a modified video content record for display based on the determined aging characteristic and the determined current age of the obtained video content record; and
   displaying the modified video content record on a display of a processor device, wherein the modified video content record for display comprises a sequence of still images associated with different ages of the obtained video content record updated to include a still image associated with the current age for the obtained video content record and wherein displaying the modified video content record comprises displaying the sequence of still images.

23. A method of displaying video content, comprising:
   obtaining a video content record to be displayed;
   determining an associated aging characteristic associated with the video content record;
   determining a current age for the obtained video content record;
   generating a modified video content record for display based on the determined aging characteristic and the determined current age of the obtained video content record; and
   displaying the modified video content record on a display of a processor device, wherein the video content record comprises a contact list of the processor device and wherein generating a modified video content record comprises generating a re-ordered display sequence for the contact list based on a most recent usage of respective contacts within the contact list.

24. A mobile terminal, comprising:
   a display;
   a video content record to be displayed; and
   an aging module configured to:
   determine an associated aging characteristic associated with the video content record;
   determine a current age for the obtained video content record by obtaining a count of power cycles since a first display of the obtained video content record, obtaining a count of calls at the mobile terminal since a first display of the obtained video content record and/or determining a charge level for a battery of the mobile terminal; and
   generate a modified video content record for display based on the determined aging characteristic and the determined current age of the obtained video content record.

25. A method of playing audio content on a mobile terminal, comprising:
   obtaining an audio content record to be played;
   determining an associated aging characteristic associated with the audio content record;
   determining a current age for the obtained audio content record by obtaining a count of power cycles since a first playing of the obtained audio content record, obtaining a count of calls at the mobile terminal since a first playing of the obtained audio content record and/or determining a charge level for a battery of the mobile terminal; and generating a modified audio content record for play based on the determined aging characteristic and the determined current age of the obtained audio content record.

26. The method of claim 25 further comprising playing the modified audio content record on a processor device.

27. The method of claim 26 wherein the method further comprises repeating determining a current age, generating a modified audio content record and playing the modified audio content to continue aging the obtained audio content record.

28. The method of claim 27 wherein determining a current age and generating a modified audio content record are preceded by playing the obtained audio content record and wherein a frequency of repeating determining a current age and generating and playing a modified audio content record is based on a predetermined elapsed time interval after playing the obtained audio content record.

29. The method of claim 27 wherein determining a current age comprises measuring a metric of the processor device and wherein generating a modified audio content record comprises generating the modified audio content record based on the measured metric and the aging characteristic of the audio content record.

30. The method of claim 27 further comprising:
saving an initial state of the obtained audio content record;
receiving a request to restore a obtained audio content record; and
replacing a current modified audio content record with the saved initial state responsive to a received request to restore an obtained audio content record.

31. The method of claim 27 wherein the processor device comprises a mobile terminal and wherein obtaining an audio content record comprises downloading the audio content record over a wireless communication link to the mobile terminal from a content server.

* * * * *